US010634847B2

(12) United States Patent
Hartkorn (10) Patent No.: US 10,634,847 B2
(45) Date of Patent: Apr. 28, 2020

(54) OPTICAL FIBER COATING STRIPPING THROUGH RELAYED THERMAL RADIATION (71) Applicant: Corning Optical Communications LLC, Hickory, NC (US)

(72) Inventor: Klaus Hartkorn, Painted Post, NY (US)

(73) Assignee: Corning Optical Communications LLC, Charlotte, NC (US)

(*) Notice: Subject to any disclaimer, the term of this patent is extended or adjusted under 35 U.S.C. 154(b) by 216 days.

(21) Appl. No.: 15/602,608

(22) Filed: May 23, 2017

(65) Prior Publication Data

US 2017/0343735 A1   Nov. 30, 2017

Related U.S. Application Data (60) Provisional application No. 62/342,263, filed on May 27, 2016.

(51) Int. Cl.
G02B 6/00 (2006.01)
G02B 6/245 (2006.01)
B08B 7/00 (2006.01)

(52) U.S. Cl.
CPC ............ *G02B 6/245* (2013.01); *B08B 7/0007* (2013.01); *B08B 7/0071* (2013.01); *B08B 2240/02* (2013.01)

(58) Field of Classification Search
CPC ..... G02B 6/245; B08B 7/0071; B08B 7/0007; B08B 2240/02
See application file for complete search history.

(56) References Cited

U.S. PATENT DOCUMENTS 2,636,408 A   4/1953 Mitchell
4,055,616 A   10/1977 Keen et al.
(Continued)

FOREIGN PATENT DOCUMENTS

DE   3224465 A1   1/1994
WO   2004008598 A2   1/2004

OTHER PUBLICATIONS

3sae Technology, Burst Technology Applications. http://www.3sae.com/bursttechnology.php, retrieved on May 24, 2016. 2 pgs.
(Continued)

*Primary Examiner* — Ellen E Kim
(74) *Attorney, Agent, or Firm* — Kapil U. Banakar (57) ABSTRACT Optical fiber coating stripping through relayed thermal radiation is disclosed. A heat source is provided that is configured to emit thermal radiation when activated. A relay system is provided that is configured to receive the emitted thermal radiation from the heat source and relay the emitted thermal radiation to a heating region. For example, the relay system may be configured to relay (i.e., re-direct) the thermal radiation to a concentrated heating region. The heat source and relay system are configured such that thermal radiation relayed by the relay system causes the temperature in the heating region to reach or exceed a vaporization or thermal decomposition temperature of a coating(s) of an optical fiber to be stripped. When an optical fiber is disposed in the heating region, and the heat source is activated, a coating(s) of the optical fiber decomposes thus stripping the coating(s) from the optical fiber.

22 Claims, 7 Drawing Sheets

(56) References Cited

U.S. PATENT DOCUMENTS

| | | | |
|---|---|---|---|
| 5,111,325 A * | 5/1992 | DeJager | G02B 13/0005 359/206.1 |
| 5,378,300 A | 1/1995 | Huvard et al. | |
| 5,968,283 A | 10/1999 | Walraven et al. | |
| 5,969,877 A * | 10/1999 | Maeda | G02B 13/0005 359/206.1 |
| 6,244,323 B1 | 6/2001 | Miller | |
| 6,402,856 B1 | 6/2002 | Vetrano | |
| 6,436,198 B1 | 8/2002 | Swain et al. | |
| 7,003,985 B2 | 2/2006 | Swain et al. | |
| 8,317,972 B2 | 11/2012 | Dunwoody et al. | |
| 8,330,081 B2 | 12/2012 | Dimmick et al. | |
| 8,557,052 B2 | 10/2013 | Lambert et al. | |
| 8,755,654 B1 | 6/2014 | Dean et al. | |
| 9,453,964 B2 * | 9/2016 | Barnes | G02B 6/245 |
| 2002/0100748 A1 | 8/2002 | Andersen | |
| 2003/0061837 A1 | 4/2003 | Swain et al. | |
| 2003/0062070 A1 * | 4/2003 | Swain | B08B 7/0071 134/105 |
| 2004/0055161 A1 * | 3/2004 | Chiang | G02B 6/245 30/90.4 |
| 2004/0079390 A1 * | 4/2004 | Wiley | G02B 6/245 134/19 |
| 2004/0231466 A1 | 11/2004 | Oldigs et al. | |
| 2007/0034057 A1 | 2/2007 | Khoshneviszadeh | |
| 2007/0172191 A1 | 7/2007 | Song | |
| 2008/0128084 A1 | 6/2008 | Dunwoody et al. | |
| 2011/0042367 A1 | 2/2011 | Dimmick et al. | |
| 2012/0128303 A1 | 5/2012 | Koyoma et al. | |
| 2014/0284320 A1 * | 9/2014 | Nobori | H01L 21/67103 219/553 |
| 2014/0332510 A1 * | 11/2014 | Danley | B23K 26/38 219/121.69 |
| 2016/0223775 A1 * | 8/2016 | Wu | C23C 18/02 |
| 2016/0349453 A1 * | 12/2016 | Wu | G02B 6/245 |
| 2018/0031766 A1 * | 2/2018 | Carlson | G02B 6/2555 |

OTHER PUBLICATIONS

Chung et al; "Noncontact Optical Fiber Coating Removal Technique With Hot Air Stream"; Journal of Lightwave Technology, IEEE, vol. 23, No. 2 Feb. 2005, pp. 551-557.

* cited by examiner

OPTICAL FIBER COATING STRIPPING THROUGH RELAYED THERMAL RADIATION

CROSS-REFERENCE TO RELATED APPLICATIONS

This application claims the benefit of priority under 35 U.S.C. § 119 of U.S. Provisional Application No. 62/342,263, filed on May 27, 2016, the content of which is relied upon and incorporated herein by reference in its entirety.

BACKGROUND

This disclosure relates generally to stripping optical fiber coatings and more particularly to methods and apparatuses for non-contact stripping of optical fiber coatings.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" fiber optic connector).

A ferrule bore typically has a size that is only slightly larger than a "bare" optical fiber to provide the fixed positional relationship mentioned above. The term "bare" is used because optical fibers, which are often glass, are normally surrounded by one or more protective coatings/layers. For example, many glass optical fibers include one or more polymer coatings (e.g., acrylic) for moisture protection. Thus, removal of polymer coating(s) is typically required prior to inserting a glass optical fiber into a ferrule bore, regardless of where installation occurs or the type of connector used for connectorization. For field installations, an inherently accurate and robust coating stripping tool can be of particular importance because the technicians or operators making the installations may have varying amounts of relevant training or experience.

Various processes of stripping optical fibers are known, including mechanical stripping, chemical stripping, hot-gas stripping, and laser stripping. Each of these techniques presents its own challenges. For example, mechanical stripping includes physically removing material from a coated optical fiber with one or more blades. The blades have the potential to cause flaws in the bare optical fibers and reduce their tensile strengths.

Regarding the other methods mentioned above, chemical stripping uses chemicals to dissolve material intended to be removed, but the chemicals may require extensive safety measures and procedures to protect the environment. Hot-gas stripping uses a heated jet of gas (e.g., nitrogen or air) to melt and remove material, which can be difficult to control and may result in considerable debris. Laser stripping involves using one or more laser beams to vaporize or ablate material, but can require complex and expensive equipment to distribute the laser energy around the optical fiber in a desired manner.

SUMMARY

Aspects of this disclosure involve optical fiber coating stripping through relayed thermal radiation. In certain disclosed aspects, a heat source is provided that is configured to emit thermal radiation (e.g., infrared light) when activated. A relay system is provided that is configured to receive the emitted thermal radiation from the heat source and relay (i.e., re-direct) the emitted thermal radiation to a heating region. For example, the relay system may be configured to relay the thermal radiation to a concentrated heating region or area. The heat source and relay system are configured such that thermal radiation relayed by the relay system causes the temperature in the heating region to reach or exceed a vaporization or thermal decomposition temperature of at least one coating of an optical fiber to be stripped. Thus, when an optical fiber is disposed in the heating region, and the heat source is activated, at least one coating of the optical fiber decomposes, thus stripping the at least one coating from the optical fiber in a non-contact method. As one example, the at least one coating of the optical fiber may decompose into a gas and cause sufficient pressure to build up inside a secondary coating to cause an explosive rupture around the secondary coating of the optical fiber to strip the primary coating without damages to the optical fiber.

As a non-limiting example, the relay system allows a spatial distance to be provided between the optical fiber and the heat source during stripping, which may allow easier access to the optical fiber, such as for performing additional processing steps (e.g., cleaving and polishing). Without the relay system, only a small portion (e.g., 5% or less) of the thermal radiation emitted by the heat source may be directed to the heating region, which may not sufficiently raise the temperature of the heating region to exceed a vaporization or thermal decomposition temperature of an optical fiber coating. The separation distance between the optical fiber and the heat source may also be determined based on the separation distance required to reduce or avoid the stripped coating from being deposited on the relay system, which may otherwise reduce the thermal radiation relay efficiency of the relay system.

In one embodiment, an apparatus for stripping at least one coating from a lengthwise section of an optical fiber is provided. The apparatus comprises a heat source configured to generate thermal radiation. The apparatus also comprises a heating region spaced a separation distance from the heat source and configured to accommodate the optical fiber. The apparatus also comprises a relay system configured to relay at least a portion of the thermal radiation from the heat source to the heating region for heating the heating region to a temperature above a thermal decomposition temperature of the at least one coating of the optical fiber. The apparatus also comprises a securing mechanism configured to secure the optical fiber so that the lengthwise section of the optical fiber is positioned in the heating region. The apparatus also comprises a controller configured to activate the heat source.

In another embodiment, a method of stripping at least one coating from a lengthwise section of an optical fiber is provided. The method comprises securing the optical fiber so that the lengthwise section of the optical fiber is positioned in a heating region. The method also comprises activating a heat source to generate thermal radiation, wherein the heat source is spaced a separation distance from the heating region. The method also comprises relaying at least a portion of the thermal radiation from the heat source to the heating region to heat the heating region to a temperature above a thermal decomposition temperature of the at least one coating of the optical fiber.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
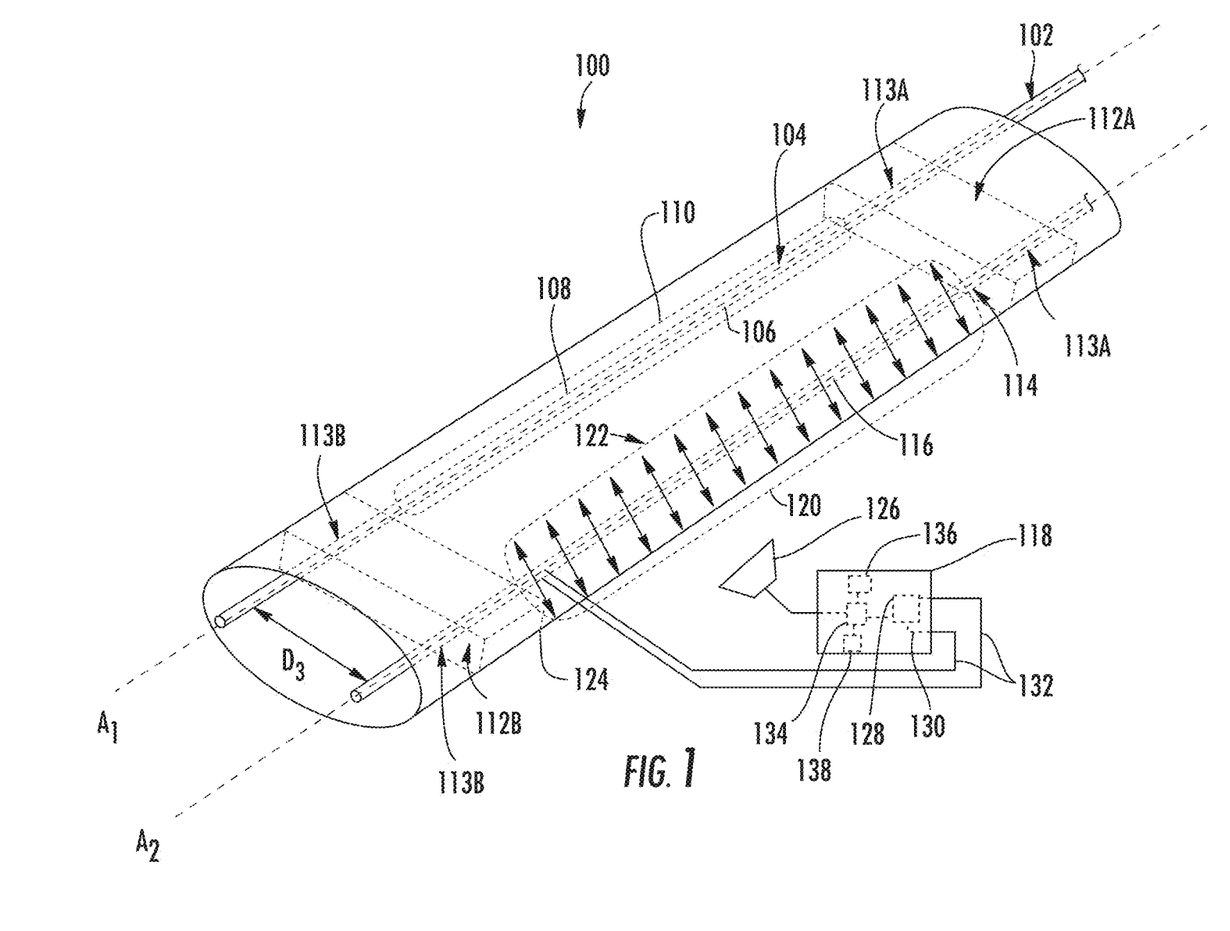
FIG. 1 is a schematic perspective view of an optical fiber coating stripping apparatus configured to secure a length of unstripped optical fiber in a heating region and relay thermal radiation received from a heat source to the heating region to strip a coating(s) from an optical fiber, in accordance with an embodiment of this disclosure.

FIG. 1 is a schematic perspective view of one example of an optical fiber coating stripping apparatus 100 ("apparatus 100") that is configured to strip one or more coatings from an optical fiber. As shown in the example in FIG. 1, an optical fiber 102 has a coating 106, which may be a polymeric coating for example. The apparatus 100 may be included in any fiber optic tool, including a tool designed to perform other processing steps, such as cleaving, polishing, and/or connector assembly.

In general, the apparatus 100 includes a heating region 110 in which a lengthwise section 108 of an end section 104 of the optical fiber 102 is disposed. The lengthwise section 108 of the optical fiber 102 may even be secured in the heating region 110 by securing mechanisms 112A, 112B along a longitudinal axis $A_1$. For example, the securing mechanisms 112A, 112B may be clamps, plates, or clips with or without alignment features, such as V-grooves 113A, 113B or the like. The apparatus 100 also includes a heat source 114 and a relay system 124. The heat source 114 is spaced away from the heating region 110 and configured to generate thermal radiation 120. The relay system 124 is configured to relay at least a portion of the thermal radiation 120 from the heat source 114 to the heating region 110 so that the heating region 110 is heated to a temperature above a thermal decomposition temperature of the coating 106. As a result of this heating, the coating 106 is stripped (i.e., removed) from the lengthwise section 108 of the optical fiber 102.

Figure 2:
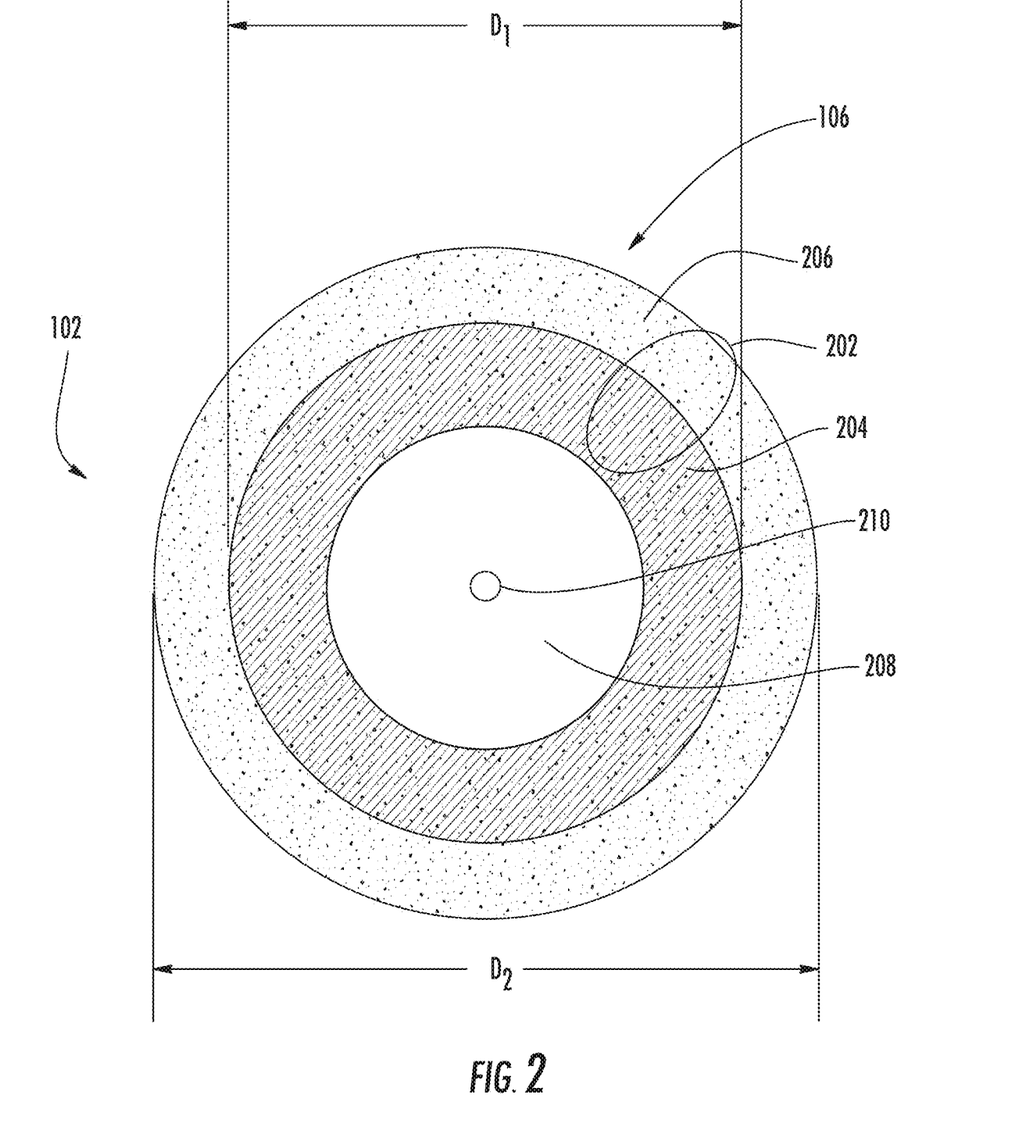
FIG. 2 is an isolated cross-sectional view of an example of the unstripped optical fiber of FIG. 1.

An example of the optical fiber 102 and its coating 106 is shown in FIG. 2. The optical fiber 102 in FIG. 2 includes a glass core 210 ("core 210"), a glass cladding 208 ("cladding 208"), and the coating 106, which in the embodiment shown is in the form of a multi-layer coating. In other embodiments, the coating 106 may comprise a single layer coating (i.e., consist of only one layer). Thus, as used herein, "coating 106" generically refers to the layer(s) of material applied to the cladding 208 of the optical fiber 102. Each layer itself may be considered a coating. Thus, in some embodiments the optical fiber 102 may have a coating 106 in the form a single coating, whereas in other embodiments (e.g., FIG. 2) the coating 106 may be in the form of multiple coatings.

Still referring to FIG. 2, the coating 106 may comprise a dual-layer polymer coating 202 comprising an inner, primary coating 204 and an outer, secondary coating 206. The inner, primary coating 204 may be configured to act as a shock absorber to minimize attenuation caused by microbending of the optical fiber 102. The outer, secondary coating 206 may be configured to protect the inner, primary coating 204 against mechanical damage, and to act as a barrier to lateral forces. For example, the inner, primary coating 204 may have a diameter $D_1$ of about 200 microns (μm). The coating 106 may further include a colored, thin ink layer applied to the outer, secondary coating 206 for identification. The outer diameter $D_2$ of the optical fiber 102 with the coating 106 (i.e., the outer diameter defined by the coating 106) may be about 250 μm as an example.

In accordance with an embodiment of this disclosure, the cladding 208 and the core 210 have a higher thermal decomposition temperature than the inner, primary coating 204 and the outer, secondary coating 206. Also in this example, the inner, primary coating 204 is softer than and has a lower thermal decomposition temperature than the outer, secondary coating 206. A variety of polymeric materials are suitable for use as the primary and secondary coatings 204, 206. For example, the inner, primary coating 204 may be a soft ultra-violet (UV)-cured polymer, and the outer, secondary coating 206 may be a highly cross-linked UV-cured polymer. The inner, primary coating 204 may have a thermal decomposition temperature that differs from a thermal decomposition of the outer, secondary coating 206 by about 100° C., or even over 100° C. In one example, the inner, primary coating 204 has a thermal decomposition temperature of about 279° C., and the outer, secondary coating 206 has a thermal decomposition temperature of about 384° C.

Turning back to FIG. 1, to remove the coating 106 from the optical fiber 102, the heat source 114 is provided in the apparatus 100. The heat source 114 (e.g., a heater) is supported by the V-grooves 113A, 113B in the respective securing mechanisms 112A, 112B along longitudinal axis $A_2$, which is parallel or substantially parallel to the longitudinal axis $A_1$ of the lengthwise section 108 of the optical fiber 102. This arrangement helps enable the lengthwise section 108 of the optical fiber 102 to be heated substantially uniformly both radially and axially by the heat source 114. For example, the heat source 114 may be an electrical resistive wire 116 ("resistive wire 116") configured to generate heat energy in response to an electrical current applied to the resistive wire 116. The resistive wire 116 is a line heat source. A "line" heat source is a heating element in the shape of a two-dimensional line, wherein the heating element emits thermal radiation along the length of the line. A controller 118 is provided in this example to apply an electrical current to the resistive wire 116 to activate the heat source 114. The resistive wire 116 may become very hot in response to an applied electrical current. As another example, the heat source 114 may be a ceramic heater comprising a ceramic material configured to generate thermal radiation in response to a voltage applied to the ceramic material. In this example, the controller 118 could alternatively be configured to apply a voltage to activate the heat source 114. It may be desired to locate the heat source 114 a distance away from the lengthwise section 108 of the optical fiber 102 so that the heat source 114 does not interfere with other processing steps that may be performed on the optical fiber 102 before and/or after the coating 106 is removed. However, by locating the heat source 114 a distance away from the lengthwise section 108 of the optical fiber 102, convective heat transfer through the air between the heat source 114 and the optical fiber 102 may not sufficiently remove the coating 106 from the optical fiber 102. More specifically, convective heat transfer may not sufficiently transfer heat to the optical fiber 102 to raise the temperature of the coating 106 above the thermal decomposition temperature of the coating 106.

In this regard, the heat source 114 is controlled by the controller 118 to transfer emitted thermal radiation (i.e., light, e.g., infrared (IR) light) 120 to the heating region 110 to remove the coating 106 from the lengthwise section 108 of the optical fiber 102. The heat source 114 in this example emits the thermal radiation 120 in all directions. But as shown in FIG. 1, only a portion 122 (e.g., 5%) of the thermal radiation 120 emitted from the heat source 114 is directed from the heat source 114 to the heating region 110. The portion 122 of the thermal radiation 120 may also not sufficiently transfer heat to the heating region 110 to raise the temperature of the heating region 110 to a temperature above the thermal decomposition temperature of the coating 106. Thus, to increase thermal radiation transfer from the heat source 114 to the heating region 110, a relay system 124 is included in the apparatus 100. As will be described in more detail, the relay system 124 is configured to receive the emitted thermal radiation 120 from the heat source 110 and to relay (i.e., re-direct) the received thermal radiation 120 to the heating region 110. The heating region 110 in this example is located a separation distance $D_3$ away from the heat source 114 to provide a separation distance between the heat source 114 and the optical fiber 102. However, the relay system 124 is capable of relaying the thermal radiation 120 to the heating region 110. The relay system 124 may be configured to concentrate the thermal radiation 120 to the heating region 110 to cause the temperature in the heating region 110 to reach or exceed a vaporization or thermal decomposition temperature of the coating 106 of the optical fiber 102. To this end, the apparatus 100 may be included in a fiber optic tool that also includes one or more other fiber processing or connectorization steps, such as cleaving, polishing, and connector assembly.

One non-limiting advantage of this arrangement is that the relay system 124 allows a spatial distance ($D_3$ in FIG. 1) to be provided between the lengthwise section 108 of the optical fiber 102 and the heat source 114 during stripping, which may allow easier access to the optical fiber 102. For example, providing a spatial distance between the optical fiber 102 and the heat source 114 may provide sufficient room for additional processing steps to be performed on the optical fiber 102 including cleaving, polishing, and connector assembly as examples. The separation distance $D_3$ between the optical fiber 102 and the heat source 114 may also be determined to avoid or reduce stripped coating 106 from depositing on the relay system 124. But also, the separation distance $D_3$ may be determined based on effectiveness of the relay system 124 to concentrate thermal radiation 120 to the heating region 110 to cause the temperature in the heating region 110 to reach or exceed a vaporization or thermal decomposition temperature of the coating 106 of the optical fiber 102. For example, the apparatus 100 may be arranged to provide a separation distance $D_3$ between the optical fiber 102 and the heat source 114 between approximately 5-50 μm for the optical fiber 102 having a 250 μm outer diameter.

FIGS. 3A-6B illustrate other examples of apparatuses that include relay systems configured to receive and relay the emitted thermal radiation 120 to the heating region 110 to remove coating 106 from the lengthwise section 108 of the optical fiber 102. The apparatuses may operate on the same basic principles as the apparatus 100 (FIG. 1). Accordingly, only the differences will be described.

Figures 3A, 3B:
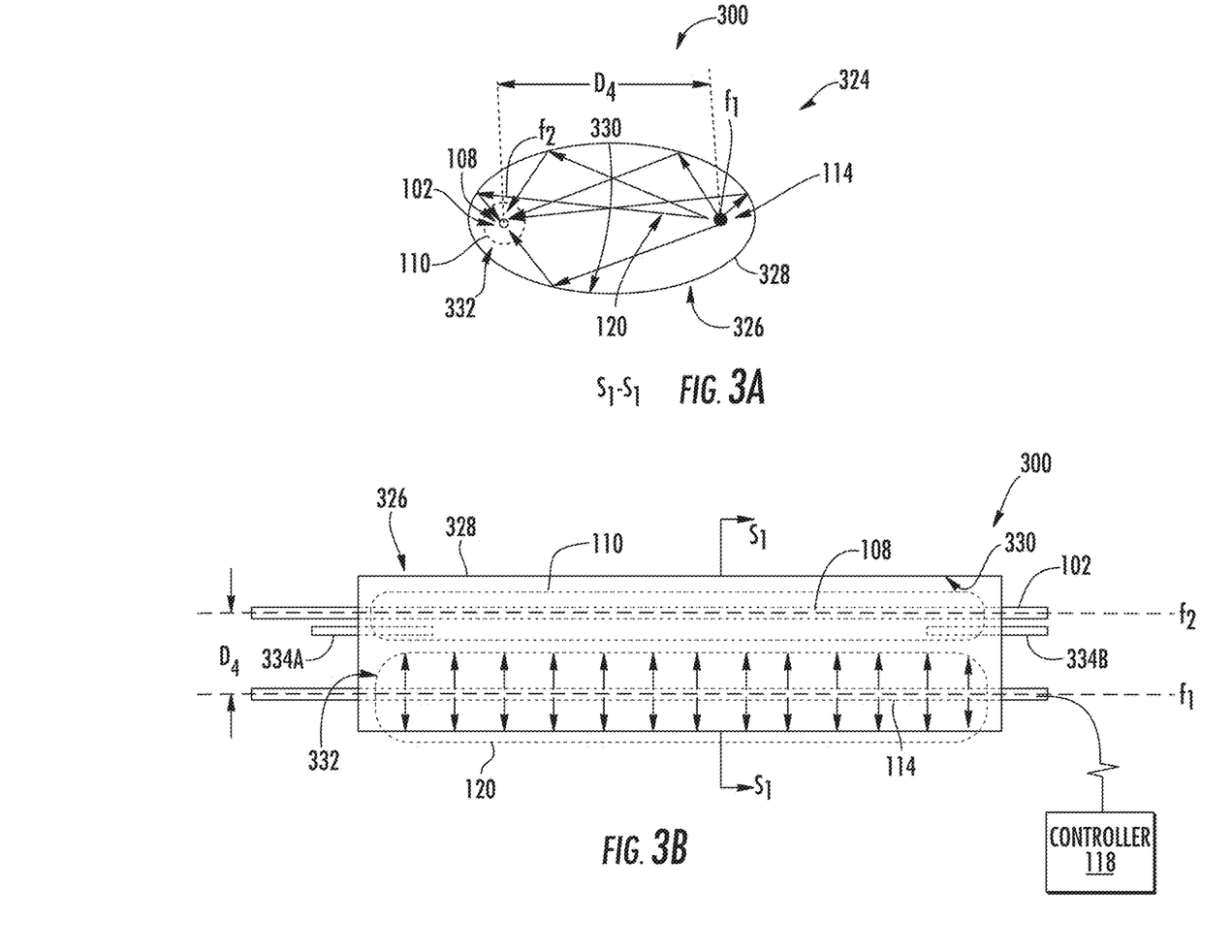
FIG. 3A is a side, cross-sectional view of an exemplary optical fiber stripping apparatus employing an exemplary reflective relay system configured to reflectively relay thermal radiation received from a heat source to a heating region to strip a coating(s) from an optical fiber, in accordance with an embodiment of this disclosure.
FIG. 3B is a top, side view of the optical fiber stripping apparatus in FIG. 3A.

In this regard, FIG. 3A is a side, cross-sectional view of an exemplary optical fiber stripping apparatus 300 ("apparatus 300") including a reflective relay system 324. The reflective relay system 324 is configured to reflectively relay thermal radiation 120 received from the heat source 114 to the heating region 110 to strip the coating 106 (FIG. 1) in accordance with an embodiment of this disclosure. FIG. 3A is shown along cross-sectional axis $S_1$-$S_1$ of a top, side view of the optical fiber stripping apparatus 300 shown in FIG. 3B.

As shown in FIG. 3B, the reflective relay system 324 includes a reflector 326 in the form of a cylinder member 328 having an elliptical-shaped cross section in this example. The cylinder member 328 has a closed, inner reflective surface 330 ("reflective surface 330") (e.g., a mirrored surface). The heat source 114, shown as extending out of the plane of FIG. 3B, may be disposed along or substantially along a first focal axis $f_1$ of the cylinder member 328. The reflective surface 330 is configured to receive and reflect at least the portion of the thermal radiation 120 emitted by the heat source 114 to the heating region 110. Because the reflective surface 330 is elliptical in shape, the reflective surface 330 is configured to reflect the thermal radiation 120 received from the heat source 114 as reflected thermal radiation 332 that becomes concentrated approximately at a second focal axis $f_2$ of the cylinder member 328. The heating region 110 extends along the second focal axis $f_2$. Thus, by locating the lengthwise section 108 of the optical fiber 102 in the heating region 110, a substantial portion of the thermal radiation 120 emitted by the heat source 114 will be reflected by the reflective surface 330 to the heating region 110. The amount of thermal radiation 120 transmitted to the heating region 110 may be sufficient to raise the temperature of the heating region 110 above the thermal decomposition temperature of the coating 106 to remove the coating 106 from the optical fiber 102.

The size of the cylinder member 328 is determined by a desired separation distance $D_4$ between the optical fiber 102 and the heat source 114. The shape of the cylinder member 328 may be modified, for example, to create a larger area of heat at the second focal axis $f_2$ in order to increase the alignment tolerances for the optical fiber 102 and the heat source 114. Further, as shown in FIG. 3B, baffles 334A, 334B may optionally be disposed within the cylinder member 328 between the heat source 114 and the heating region 110 to create a well-defined region of exposure of the heating region 110, and the optical fiber 102 located therein, to the reflected thermal radiation 332.

Figure 4A:
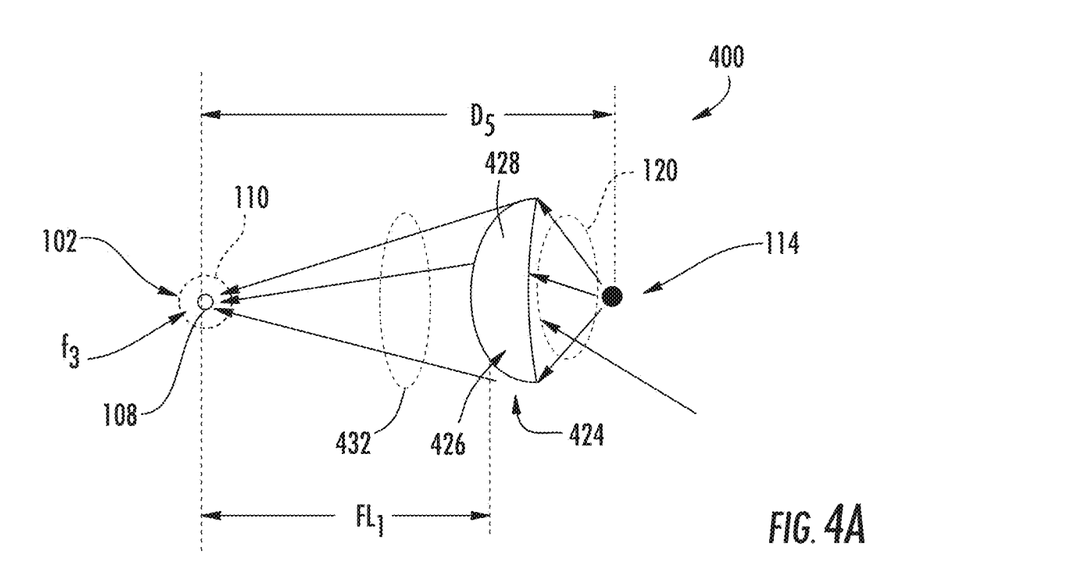
FIG. 4A is a side, cross-sectional view of an exemplary optical fiber stripping apparatus employing a refractive relay system configured to refractively relay thermal radiation received from a heat source to a heating region to strip a coating(s) from an optical fiber, in accordance with an embodiment of this disclosure.
Figure 4B:
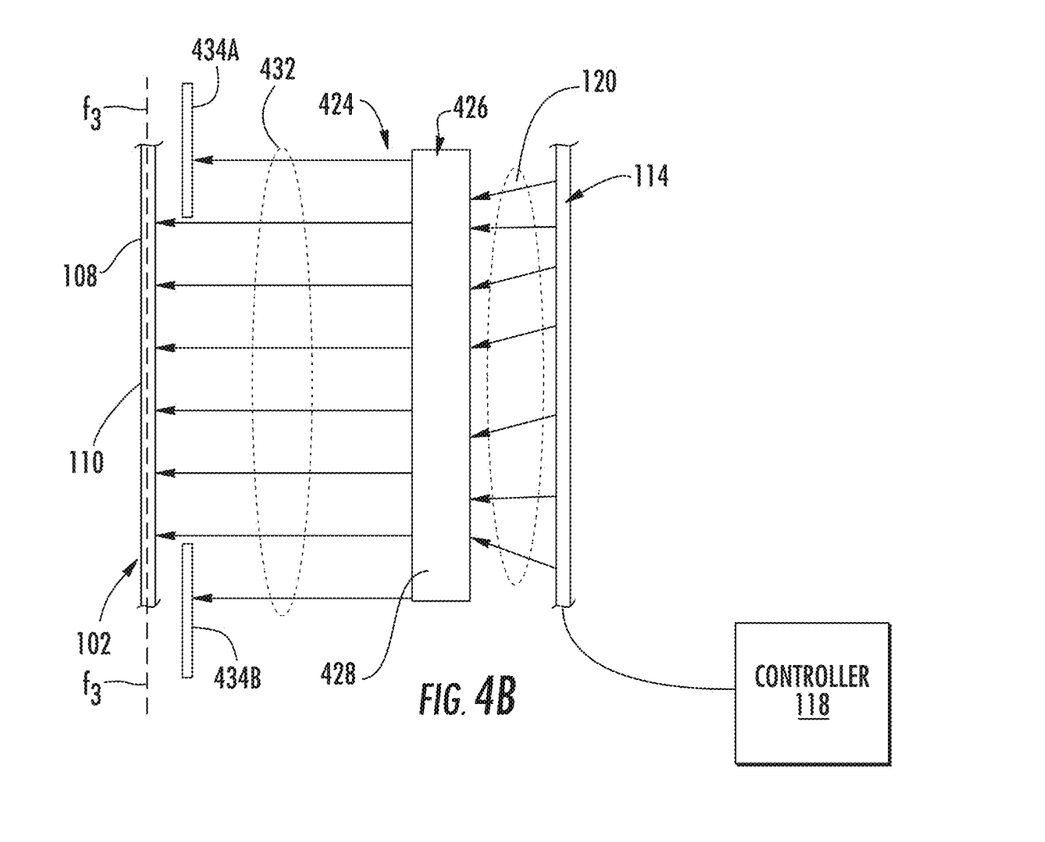
FIG. 4B is a top view of the optical fiber stripping apparatus in FIG. 4A.

FIG. 4A is a side, cross-sectional view of another exemplary optical fiber stripping apparatus 400 ("apparatus 400") including a refractive relay system 424. FIG. 4B is a top view of the apparatus 400 shown in FIG. 4A. The refractive relay system 424 is configured to refractively relay thermal radiation 120 received from the heat source 114 to the heating region 110 to strip the coating 106 from the optical fiber 102.

As shown in FIG. 4A, the refractive relay system 424 includes a focusing element 426 in the form of a convex (condenser) lens 428 in this example. The convex lens 428 is disposed between the heat source 114 and the heating region 110 and may be located a focal length $FL_1$ away from the heating region 110. The heat source 114 emits the thermal radiation 120 out in all directions from the heat source 114. The convex lens 428 is configured to receive and refract at least a portion of the thermal radiation 120 emitted by the heat source 114, which may be configured as a line heat source. The thermal radiation 120 is directed by the convex lens 428 to a focal line $f_3$, along which the heating region 110 extends. The convex lens 428 concentrates the emitted thermal radiation 120 received from the heat source 114 as reflected thermal radiation 432 in the heating region 110. Thus, the amount of thermal radiation transferred to the heating region 110 may be sufficient to raise the temperature of the heating region 110 above the thermal decomposition temperature of the coating 106 to remove the coating 106 from the optical fiber 102. Further, as shown in FIG. 4B, baffles 434A, 434B may optionally be disposed in the apparatus 400 between the focusing element 426 and the heating region 110 to create a well-defined region of exposure of the heating region 110, and the optical fiber 102 located therein, to the reflected thermal radiation 432.

The apparatus 400 in FIGS. 4A and 4B may alternatively include two heat sources and relay systems on opposite sides of the lengthwise section 108 of the optical fiber 102 to capture and relay additional thermal radiation for removing the coating 106. It may be desirable to use a convex lens 428 with a high numerical aperture to capture the maximum amount of thermal radiation 120 emitted by the heat source 114. Further, the size of the convex lens 428 is determined by the desired separation distance $D_5$ between the optical fiber 102 and the heat source 114. The shape of the convex lens 428 may be modified, for example, to create a larger area of heat at the focal line $f_3$ in order to increase the alignment tolerances for optical fiber 102 and the heat source 114. Also note that the refractive relay system 424 in FIGS. 4A and 4B may comprise other types of lenses. An example includes a Fresnel lens. A Fresnel lens has the advantage of focusing light through a series of concentric grooves to provide individual refracting surfaces with a physically narrower profile than a convex lens.

Figure 5A:
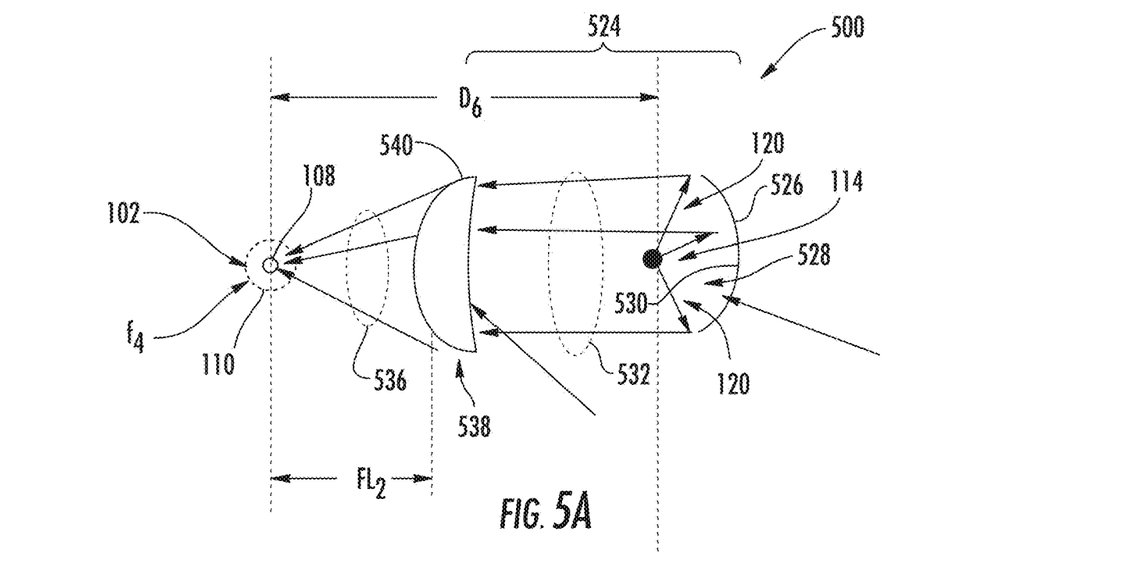
FIG. 5A is a side, cross-sectional view of an exemplary optical fiber stripping apparatus employing a reflective/refractive relay system configured to relay thermal radiation received from a heat source to a heating region to strip a coating(s) from an optical fiber, in accordance with an embodiment of this disclosure.
Figure 5B:
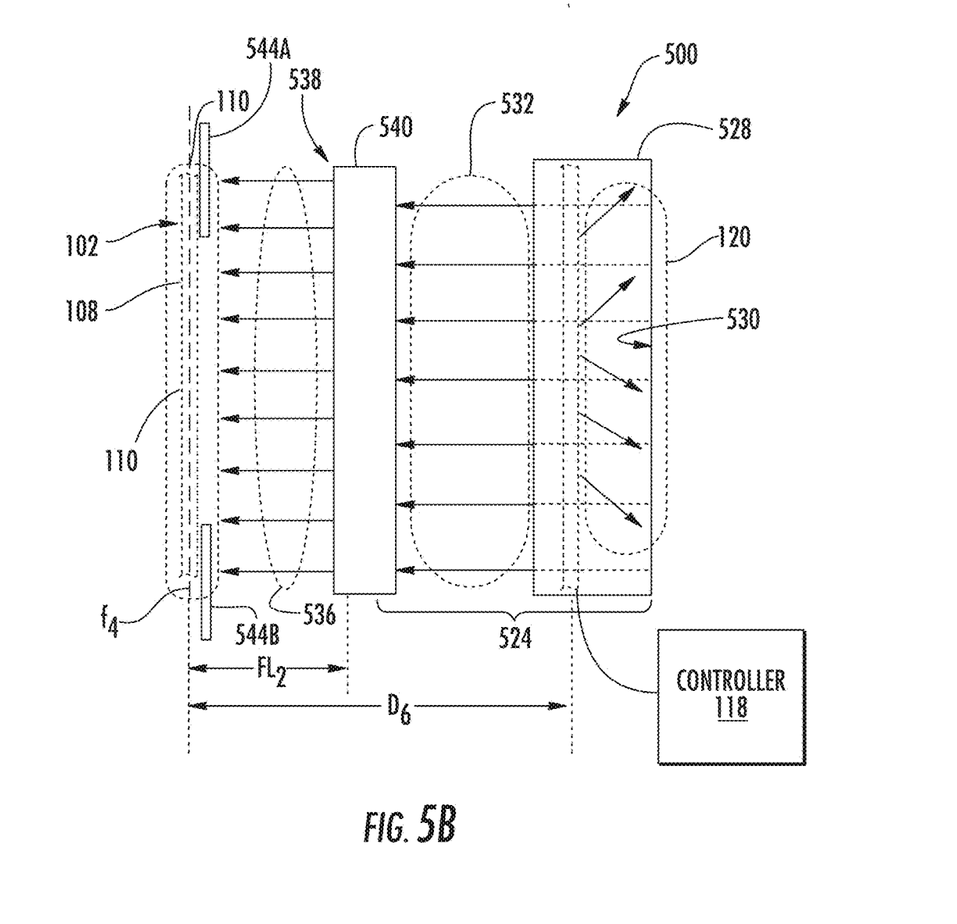
FIG. 5B is a front view of the optical fiber stripping apparatus in FIG. 5A.

FIGS. 5A and 5B illustrate another exemplary optical fiber stripping apparatus 500 ("apparatus 500") including reflective/refractive relay system 524. The reflective/refractive relay system 524 combines aspects of the reflective relay system 324 (FIGS. 3A and 3B), and the refractive relay system 424 (FIGS. 4A and 4B). In particular, the reflective/refractive relay system 524 is configured to reflect thermal radiation 120 received from the heat source 114 to the heating region 110 into reflected thermal radiation 532. The reflective/refractive relay system 524 is also configured to focus the reflected thermal radiation 532 into refracted thermal radiation 536 that is transmitted to the heating region 110 to strip a coating 106 from the optical fiber 102. The apparatus 500 may have the advantage of improved control of working distance and magnification factor of the thermal radiation 120.

As shown in FIGS. 5A and 5B, the reflective/refractive relay system 524 includes a reflector 526 in the form of a dish 528 having a parabolic-shaped cross-section in this example. Specifically, the dish 528 has an open, inner reflective surface 530 (e.g., a mirrored surface) having a parabolic-shaped cross-section. The reflective surface 530 is configured to receive and reflect at least the portion of the thermal radiation 120 emitted by the heat source 114 to the heating region 110. Because the reflective surface 530 is elliptical in shape, the reflective surface 530 reflects the thermal radiation 120 received from the heat source 114 as reflected thermal radiation 532 directed toward the heating region 110.

With continuing reference to FIGS. 5A and 5B, the reflective/refractive relay system 524 also includes a focusing element 538 in the form of a convex (condenser) lens 540 in this example. The convex lens 540 is disposed between the heat source 114 and the heating region 110, with the dish 528 disposed on the side of the heat source 114 opposite of the convex lens 540. The convex lens 540 may be located a focal length $FL_2$ away from the heating region 110. The convex lens 540 is configured to receive and refract the reflected thermal radiation 532 emitted by the heat source 114 as the refracted thermal radiation 536. The refracted thermal radiation 536 is directed by the convex lens 540 to focal line $f_4$ along which the heating region 110 extends. The convex lens 540 concentrates the emitted thermal radiation 120 received from the heat source 114 as refracted thermal radiation 536 in the heating region 110. Thus, the amount of thermal radiation transferred to the heating region 110 may be sufficient to raise the temperature of the heating region 110 above the thermal decomposition temperature of the coating 106 to remove the coating 106 from the optical fiber 102.

It may be desirable to use a convex lens 540 with a high numerical aperture to capture the maximum amount of thermal radiation 120 emitted by the heat source 114. Further, the size of the convex lens 540 is determined by the desired separation distance $D_6$ between the optical fiber 102 and the heat source 114. The shape of the convex lens 540 may be modified, for example, to create a larger area of heat at the focal line $f_4$ in order to increase the alignment tolerances for the optical fiber 102 and the heat source 114. Also note that the reflective/refractive relay system 524 in FIGS. 5A and 5B may comprise other types of lenses. An example is a Fresnel lens. Further, as shown in FIG. 5B, baffles 544A, 544B may optionally be disposed in the apparatus 500 between the convex lens 540 and the heating region 110 to create a well-defined region of exposure of the heating region 110, and the optical fiber 102 located therein, to the refracted thermal radiation 536.

Figure 6:
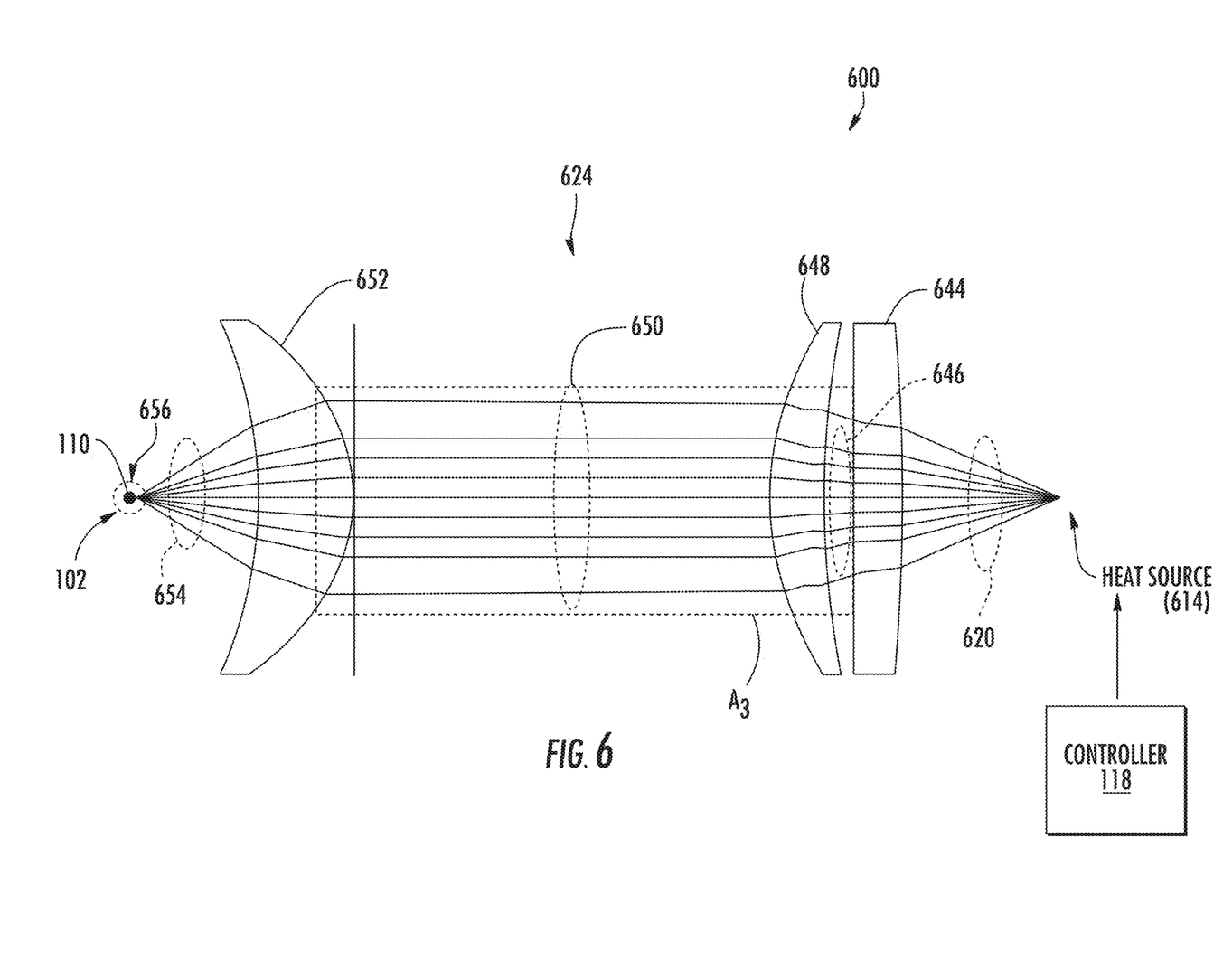
FIG. 6 is a side, cross-sectional view of an exemplary optical fiber stripping apparatus employing a reflective/refractive relay system configured to relay thermal radiation received from a heat source to a heating region to strip a coating(s) from an optical fiber, in accordance with an embodiment of this disclosure.

FIG. 6 is a side, cross-sectional view of another exemplary optical fiber stripping apparatus 600 ("apparatus 600") including refractive relay system 624. The refractive relay system 624 is configured to refractively relay thermal radiation 620 received from the heat source 614 to the heating region 110 to strip a coating 106 from the optical fiber 102. The heat source 614 in FIG. 6 is a point heat source as opposed to a line heat source like the heat source 114 in FIG. 1. By "point" heat source, it is meant that the heat source includes a heating element that emits thermal radiation from a single concentrated area or point. An example of a point heat source is a laser. As shown in FIG. 6, the refractive relay system 624 includes a cylindrical lens 644 adjacent to the heat source 614. The cylindrical lens 644 is configured to expand the thermal radiation 620 received from the heat source 614 into expanded thermal radiation 646 along a line axis $A_3$. The refractive relay system 624 also includes a first aspheric lens 648. The first aspheric lens 648 is disposed between the cylindrical lens 644 and the heating region 110. The first aspheric lens 648 is configured to receive and refract the expanded thermal radiation 646 along the line axis $A_3$ into a collimated thermal radiation 650. The refractive relay system 624 also includes a second aspheric lens 652. The second aspheric lens 652 is disposed between the first aspheric lens 648 and the heating region 110. The second aspheric lens 652 is configured to receive and focus the collimated thermal radiation 650 as focused thermal radiation 654 to a focal plane 656 of the heating region 110. Thus, the amount of thermal radiation transferred to the heating region 110 is sufficient to raise the temperature of the heating region 110 above the thermal decomposition temperature of the coating 106 to remove the coating 106 from the optical fiber 102.

Figure 7:
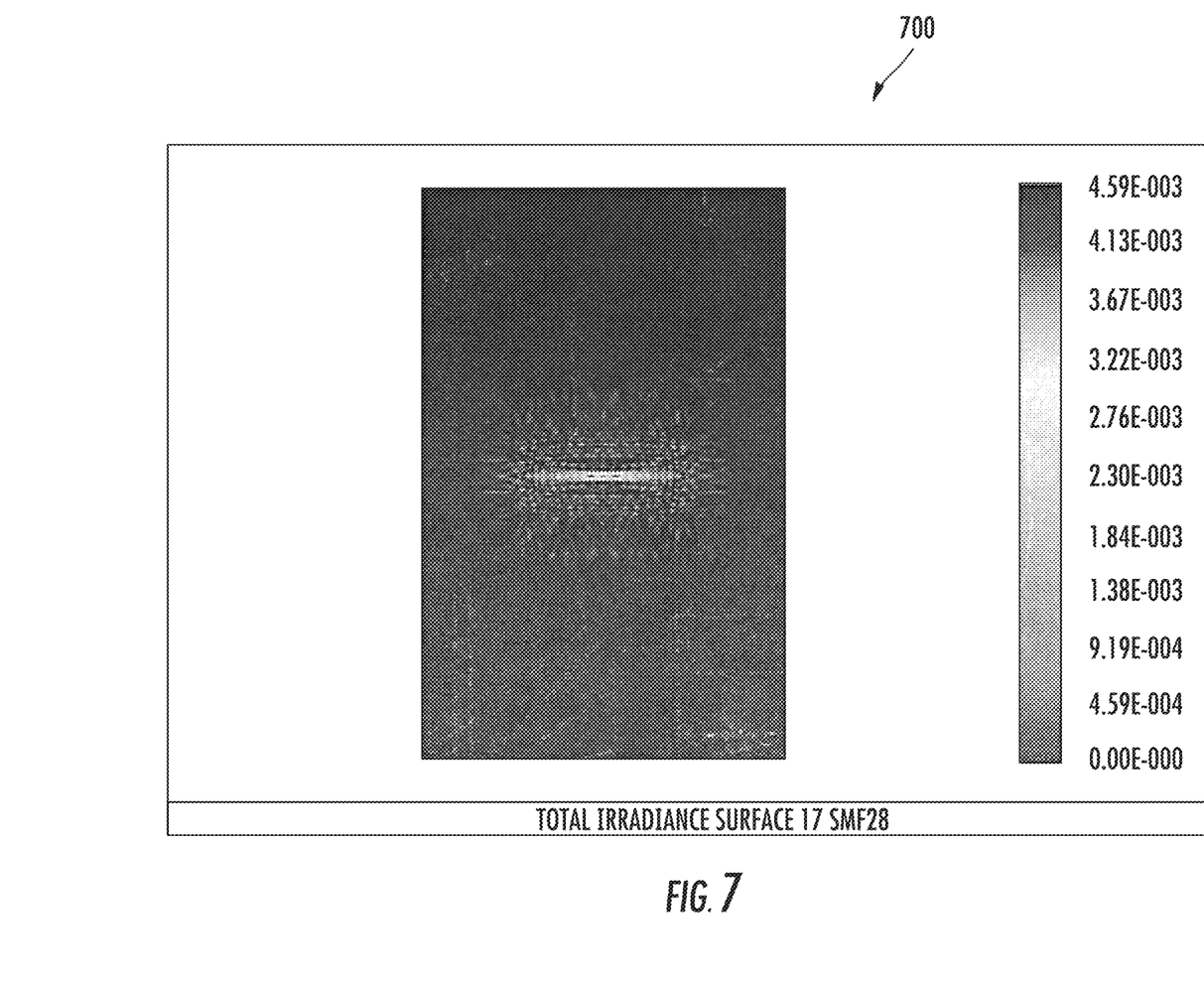
FIG. 7 is a spot diagram of the beam formed by of the optical fiber stripping apparatus in FIG. 6.

FIG. 7 is a spot intensity diagram 700 illustrating an example of heat energy distribution of the focused thermal radiation 654 in the focal plane 656 in FIG. 6 where the optical fiber 102 would be located in the optical fiber stripping apparatus 600 in FIG. 6 for stripping the coating 106 thereon. As shown therein, the thermal radiation 620 from the point heat source 614 is expanded by the optical fiber stripping apparatus 600 into the focal plane 656 which coincides with the location of the optical fiber 102, as shown in FIG. 6.

Note that with any of the relay systems above, it is also possible to provide at least two separate heat sources placed on opposite sides of the optical fiber 102 to strip the optical fiber 102 in a more uniform manner. The relay system may be configured or replicated for the multiple heat sources to relay the emitted thermal radiation to the heating region 110 to strip the coating 106 from the optical fiber 102.

Further, for some optical designs, it may be difficult to control the strip length of the optical fiber 102 since the thermal radiation 120 is focused in the direction perpendicular to the optical fiber 102, but not along the lengthwise axis $A_1$ (FIG. 1) of the optical fiber 102. Depending on the distance and the irradiation pattern of the heat source 114, it may be difficult to obtain a well-defined stripping edge of the optical fiber 102. Thus, baffles may also be included in the relay systems described in the apparatuses 100, 300, 400, 500, 600, but still at a distance from the optical fiber 102, to create a well-defined region in which the optical fiber 102 is exposed. Another method may involve the apparatuses 100, 300, 400, 500, 600 being configured to focus thermal radiation in the axial direction towards the heating region to create a more defined area of exposure of the edges of the lengthwise section 108 of the optical fiber 102.

With reference back to FIGS. 1 and 2, the primary and secondary coatings 204, 206 of the optical fiber 102 may have different vaporization or thermal decomposition temperatures. As a result, the heat source 114 may be operated to rapidly emit the thermal radiation 120 so that the relay mechanism 124 heats the heating region 110 to a temperature that is above the thermal decomposition temperature of the inner, primary coating 204, but below the thermal decomposition temperature of the outer, secondary coating 206. The inner, primary coating 204 of the optical fiber 102 may decompose into gas and sufficiently build up pressure inside the outer, secondary coating 206 to cause an explosive rupture of the region occupied by the outer, secondary coating 206, without substantially damaging the cladding 208 or the core 210 of the optical fiber 102.

As shown in FIG. 1, the lengthwise section 108 of the optical fiber 102 may be a mid span of the optical fiber 102. When the lengthwise section 108 to be stripped is a mid span of the optical fiber 102, the lengthwise section 108 may at least partially contain the pressure generated by the decomposing inner, primary coating 204. In this manner, leakage of the pressure from the lengthwise section 108 may be restricted from escaping out of ends of the lengthwise section 108, so that the pressure is contained in a restricted area (e.g., contained within the region surrounding the lengthwise section 108) in a manner that seeks to provide the desired, controlled exploding and stripping of the primary and secondary coatings 204, 206.

As a contrasting example, when the lengthwise section 108 to be stripped is an end section 104 of the optical fiber 102 as shown in FIG. 1, it may be the case that the pressure generated by vaporizing inner, primary coating 204 escapes out the end section 104 of the lengthwise section 108 such that the explosion may not occur. Instead, the primary and secondary coatings 204, 206 may decompose or burn. To address this situation and others, the end section 104 of the optical fiber 102 may be at least partially shielded, so that the end section 104 remains cool enough to serve as a boundary for substantially containing the vapor pressure. For example, one or more of the securing mechanisms 112A, 112B may include protruding shielding members or other mechanical structures (not shown) extending into opposite ends of the heating region 110 to shield an end of the optical fiber 102 from heat.

The apparatus 100 in FIG. 1 may be operated, such as under the control of the controller 118, so that the primary and secondary coatings 204, 206 are rapidly heated to the temperature at which the outer, secondary coating 206 bursts (e.g., in response to the vaporization of the inner, primary coating 204). This heating may comprise quickly heating the heat source 114 while the heat source 114 is in close proximity to the lengthwise section 108 to create a temperature field over the lengthwise section 108 that is substantially uniform. For example, the heat source 114 may have a low thermal mass, such that after it is turned on it may be rapidly heated to above 800° C. in less than one second. The close proximity of the heat source 114 to the lengthwise section 108 enables the heating of the primary and secondary coatings 204, 206 to a temperature beyond the burst temperature of about 400° C. in less than one second, causing the vaporization of the inner, primary coating 204 and bursting away of the outer, secondary coating 206 within about one second from the heat source 114 being turned on by the controller 118.

The heat source 114 may be configured and operated, such as under the control of the controller 118, so that the temperature field across the cross section of the lengthwise section 108 of the optical fiber 102 may be substantially uniform, which may have the effect of maintaining the integrity of the outer, secondary coating 206 until the burst temperature is reached. In contrast, a uniform temperature field may lead to decomposition of the outer, secondary coating 206, rendering it unable to contain sufficient vapor pressure for the desired explosion or bursting. Without the explosion process, slow decomposition and oxidation of the outer, secondary coating 206 may generate harmful gas.

The apparatus 100 may be operated so that the explosion (e.g., stripping) of the primary and secondary coatings 204, 206 occurs substantially simultaneously along the entire length of the lengthwise section 108 of the optical fiber 102. In one embodiment, the apparatus 100 is automatically operative, such as under the control of the controller 118, so that the heat source is deactivated or turned off shortly before, or not later than after (e.g., one second) (e.g., in response to), the explosion that "strips" the primary and secondary coatings 204, 206 away from the lengthwise section 108. Quickly turning off the heat source 114 in this manner seeks, for example, to avoid any oxidation and burning of the unstripped sections of the primary and secondary coatings 204, 206.

As mentioned above, the heat source 114 may include or be a resistive heating element (e.g. a strip of conductive metal and/or electrical resistive wire 116 made of conductive metal). The heat source 114 and associated features may be configured for automatically controlling the flow of electrical current through the resistive wire 116 and for controlling the heat generated by the resistive wire 116. For example, the electrical current supplied to the resistive wire 116 may be controlled by the controller 118 according to a predetermined electrical current profile. As a more specific example, the electrical current may be supplied to the resistive wire 116 for a period of time, with a greater electrical current being supplied during the first part of that time for increasing the rate of temperature rise. Then, the electrical current may be reduced once the temperature is close to the predetermined operating temperature. However, it will be appreciated that the controller 118 may provide other suitable electrical current profiles and/or be used with other types of heaters to achieve a desired heating profile(s).

Further, referring back to FIG. 1, the apparatus 100 may include at least one sensor 126, such as a sound and/or light sensor configured for sensing the explosion or bursting of the primary and secondary coatings 204, 206 of the lengthwise section 108 of the optical fiber 102. The explosion of the primary and secondary coatings 204, 206 may comprise a unique "pop" sound and flash of light, either of which may be used as a termination condition that is sensed by the sensor 126 and causes the sensor 126 to send an electrical signal to the controller 118, prompting it to deactivate or turn off the heat source 114. The sensor 126 and the controller 118 may be in communication and cooperative such that the heat source 114 is shut off (e.g., after approximately one second) by the controller 118 upon the detection of the explosive "pop" sound or the detection of emitted flash of light that are indicative of the explosion or bursting of the primary and secondary coatings 204, 206 of the lengthwise section 108 of the optical fiber 102. For example, the sensor 126 and the controller 118 may be in communication and cooperative such the heat source 114 is shut off in less than 10 milliseconds (ms), or even less than 1 ms, after the explosion that "strips" the primary and secondary coatings 204, 206 away from the lengthwise section 108 of the optical fiber 102.

As another example, the heat source 114 may be also controlled by using an appropriate sensor 126 to optically monitor a precursor of the subject explosion, such as the onset of deformation of the primary and secondary coatings 204, 206 of the optical fiber 102, a change in the diameter of the lengthwise section 108, or the like, so that the heat source 114 may be turned off prior to the explosion, which seeks to maintain the tensile strength of the optical fiber 102. For example, the controller 118 may deactivate or switch off the heat source 114 in response to the sensor 126 detecting deformation of the lengthwise section 108 of the optical fiber 102, a change in the diameter of the lengthwise section 108, and/or any other suitable triggers, wherein these triggers may be precursors to the subject explosion.

In embodiments using an acoustic or sound sensor 126, immunity to ambient sound interference may be improved by using filters which take into account an audio frequency signature of the explosion or bursting of the primary and secondary coatings 204, 206. The controller 118 may be configured so that such audio signatures may be programmed thereinto. In addition, the controller 118 and at least one sensor 126 may be cooperatively configured so that acoustic, optical, and/or other types of feedback control allow stripping methods of this disclosure to accommodate different types of one or more of the primary and secondary coatings 204, 206.

In addition or alternatively, the heat source 114 may be controlled without using the sensor 126, or the sensor 126 may be used to identify a secondary termination condition, wherein the controller 118 may be configured to turn off the heat source 114 in response to a primary termination condition that is intended to occur and normally occurs prior to the secondary termination condition. For example, the controller 118 may be configured so that the heat source 114 is turned off or deactivated at a predetermined time, wherein the predetermined time may be a specific time within a range of from about 200 milliseconds to about two seconds after the heat source 114 is turned on or activated, the predetermined time may be a specific time within a range of from about 500 milliseconds to about 1.5 seconds after the heat source 114 is activated, the predetermined time may be about 0.9 seconds after heat source 114 is activated, the predetermined time may be about 0.95 seconds after heat source 114 is activated, the predetermined time may be about 1 second after heat source 114 is activated, and/or the predetermined time may be within a range of from about 1 millisecond to about 500 milliseconds before the explosion that "strips" the primary and secondary coatings 204, 206 away from the lengthwise section 108 of the optical fiber 102. The selection of the predetermined time at which the controller 118 turns off the heat source 114 may depend upon factors associated with the configuration of the primary and secondary coatings 204, 206 and/or the configuration of the apparatus 100; therefore, the predetermined time may be determined based upon empirical evidence.

After the optical fiber 102 is mounted to the securing mechanisms 112A, 112B as generally shown in FIG. 1, and the stripping process is initiated, such as by a user operating a feature, such as a button, key, or the like, that may be provided by the controller 118, or the user otherwise initiating the providing of the electrical current to the heat source 114, the apparatus 100 may be able to strip the primary and secondary coatings 204, 206 from the lengthwise section 108 of the optical fiber 102 in less than about two seconds. It may take about one second or less for the resistive wire 116 to reach its maximum temperature, and the primary and secondary coatings 204, 206 of the lengthwise section 108 of the optical fiber 102 may remain intact for about the first 0.8 seconds after the heat source 114 is activated. The heat source 114 may be substantially fully heated at about 0.95 seconds or about one second after power is switched on for the heat source 114, wherein the resistive wire 116 being yellow-white hot is schematically represented by horizontal hatching in the resistive wire 116. Substantially the entirety of the primary and secondary coatings 204, 206 of the lengthwise section 108 of the optical fiber 102 may be exploded away from the cladding 208 of the lengthwise section 108 of the optical fiber 102, wherein the explosion is schematically represented by stippling. This explosion may occur at about 1 second after power is switched on for the heat source 114, and the explosion may be accompanied by an audible "pop" sound and/or a flash of light that may be detected by the sensor(s) 126.

The electrical power to the heat source 114 may be turned off shortly before or after the explosion, such as in response to the sensor 126 sensing an audible "pop" sound and/or a flash of light that may be associated with the explosion. Thereafter, the heat source 114 may be quickly cooled by the ambient environment, such as in about five seconds after the heat source 114 has been turned off. The portion of the cladding 208 from which the primary and secondary coatings 204, 206 have been stripped may substantially match both the length of the heating region 110 and the length of the resistive wire 116. The majority of the sections of the primary and secondary coatings 204, 206 that are stripped may burst away from the cladding 208 substantially without generating smoke, and substantially without leaving carbon residue on the cladding 208.

As also shown in FIG. 1, the controller 118 may include a rechargeable battery 128 that powers the controller 118 and provides electrical current to the heat source 114. In one example, the rechargeable battery 128 may be a 12 volt power supply with duty cycle and duration controls. The controller 118 may further include a switch 130 that opens and closes a circuit 132 which provides the electrical current to the heat source 114. In embodiments including an electrically powered heat source 114, such as the resistive wire 116, the controller 118 may turn on or switch on the heat source 114 by closing the switch 130 to initiate a flow of electrical current to the heat source 114. Conversely, the controller 118 may turn off the heat source 114 by opening the switch 130 to stop the flow of electrical current to the heat source 114 when the termination condition is met, wherein the termination condition may be the explosion of the primary and secondary coatings 204, 206, any suitable precursor thereto, and/or a predetermined time, such as the predetermined times discussed above.

The sensor 126 and the heat source 114 may both be portable pluggable devices capable of being plugged into and in electrical communication with (e.g., powered by) the controller 118. The controller 118 may be a portable handheld device that may be in some ways similar to or associated with a smartphone, or the like, and the securing mechanisms 112A, 112B may also be portable, such that the entire apparatus 100 may be portable and suitable for field use. Alternatively or in addition, the apparatus 100 may also be configured for use in manufacturing settings.

The controller 118 may include processing circuitry, such as processing circuitry of a computer, that is configurable to perform actions in accordance with one or more exemplary embodiments disclosed herein. In some exemplary embodiments, the processing circuitry may include a processor 134 and memory 136. The processing circuitry may be in communication with or otherwise control, for example, a user interface 138, and one or more other components, features and/or modules (e.g., software modules). The user interface 138 may include a feature, such as a button, key, or the like, for being actuated by a user to initiate the stripping process. The processor may be embodied in a variety of forms. For example, the processor may be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. The processor may comprise a plurality of processors. The plurality of processors may be in operative communication with each other and may be collectively configured to perform one or more functionalities of this disclosure. In some exemplary embodiments, the processor may be configured to execute instructions that may be stored in the memory or that may be otherwise accessible to the processor. As such, whether configured by hardware or by a combination of hardware and software, the processor is capable of performing operations according to various embodiments of this disclosure.

In some exemplary embodiments, the memory may include one or more memory devices. The memory may include fixed and/or removable memory devices. In some embodiments, the memory may provide a non-transitory computer-readable storage medium that may store computer program instructions that may be executed by the processor. In this regard, the memory may be configured to store information, data, applications, instructions and/or the like for enabling the stripping apparatus 100 to carry out various functions in accordance with the various embodiments of this disclosure. In some embodiments, the memory may be in communication with one or more of the processor 134, user interface 138, and one or more other modules via bus(es) for passing information.

The user interface 138 may be in communication with the processing circuitry to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms.

In one embodiment, the controller 118 may include a number of different modules for selection by a user. Each module may comprise an electrical current profile defining the electrical current pulse(s) to be supplied to the heat source 114 and the duration of the pulse(s) (e.g., there may be a single stage of electrical current, or there may be multiple stages of electrical currents with the same or different durations). Accordingly, the operating of the heat source 114 for a predetermined time may comprise a single stage of electrical current being supplied to the heat source 114 for the predetermined time, or the operating of the heat source 114 for a predetermined time may comprise multiple stages of electrical currents being supplied to the heat source 114 during the predetermined time. For example, the controller 118 may be an open-loop controller that does not rely on the feedback from the sensor 126 regarding the explosion of the primary and/or secondary coatings 204, 206. The various electrical current profiles may have some (e.g., slight) dependence on the materials of the primary and/or secondary coatings 204, 206, the diameters of the primary and secondary coatings 204, 206, the inclusion of any colored ink layers for identification, and/or any other suitable factors. These factors and/or one or more other conditions may be pre-stored in modules of the controller 118 that are made available for selection by way of the user interface 138.

Persons skilled in fiber stripping or optical connectivity will appreciate additional variations and modifications of the devices and methods already described. Additionally, where a method claim below does not explicitly recite a step mentioned in the description above, it should not be assumed that the step is required by the claim. Furthermore, where a method claim below does not actually recite an order to be followed by its steps or an order is otherwise not required based on the claim language, it is no way intended that any particular order be inferred.

The above examples are in no way intended to limit the scope of the present disclosure. It will be understood by those skilled in the art that while the present disclosure has been discussed above with reference to examples of embodiments, various additions, modifications and changes can be made thereto without departing from the spirit and scope of the disclosure as set forth in the claims.

What is claimed is:

1. An apparatus for stripping at least one coating from a lengthwise section of an optical fiber, comprising:
    a heat source configured to generate thermal radiation, wherein the heat source comprises an electrical resistive wire configured to generate thermal radiation in response to an electrical current passing through the electrical resistive wire;
    a heating region spaced a separation distance from the heat source and configured to accommodate the optical fiber;
    a relay system configured to relay at least a portion of the thermal radiation from the heat source to the heating region for heating the heating region to a temperature above a thermal decomposition temperature of the at least one coating of the optical fiber;
    a securing mechanism configured to secure the optical fiber so that the lengthwise section of the optical fiber is positioned in the heating region; and
    a controller configured to activate the heat source.

2. The apparatus of claim 1, wherein the relay system comprises at least one reflective surface configured to receive and reflect the thermal radiation.

3. The apparatus of claim 2, wherein:
    the relay system comprises a cylinder member having an elliptical-shaped cross-section with a first focal axis and a second focal axis;
    the at least one reflective surface is an inner surface of the cylinder member, wherein:
    the heat source is disposed substantially along the first focal axis; and
    the heating region is located substantially along the second focal axis.

4. The apparatus of claim 1, wherein the relay system comprises at least one focusing element disposed between the heat source and the heating region, the at least one focusing element configured to receive the thermal radiation from the heat source and focus the thermal radiation in the heating region.

5. The apparatus of claim 4, wherein the heating region is located approximately at the focal plane of the at least one focusing element.

6. The apparatus of claim 4, wherein the at least one focusing element is comprised from the group consisting of a convex lens and a Fresnel lens.

7. The apparatus of claim 1, wherein the relay system comprises:
    at least one reflective surface configured to receive and reflect the thermal radiation; and
    at least one focusing element configured to receive the thermal radiation from the heat source and focus the thermal radiation to the heating region.

8. The apparatus of claim 7, wherein the at least one reflective surface comprises a reflective surface having a parabolic-shaped cross-section.

9. The apparatus of claim 1, wherein the relay system comprises:
    a first aspheric lens disposed between the heat source and the heating region;
    a second aspheric lens disposed between the first aspheric lens and the heating region; and
    a cylindrical lens disposed between the first aspheric lens and the heat source.

10. The apparatus of claim 1, wherein the heat source comprises a ceramic material configured to generate thermal radiation in response to a voltage applied to the ceramic material.

11. The apparatus of claim 1, wherein the separation distance is between approximately 5-50 µm.

12. A method of stripping at least one coating from a lengthwise section of an optical fiber, comprising:
    securing the optical fiber so that the lengthwise section of the optical fiber is positioned in a heating region;
    activating a heat source to generate thermal radiation, wherein the heat source is spaced a separation distance from the heating region and wherein the heat source comprises an electrical resistive wire configured to generate thermal radiation in response to an electrical current passing through the electrical resistive wire; and
    relaying at least a portion of the thermal radiation from the heat source to the heating region to heat the heating region to a temperature above a thermal decomposition temperature of the at least one coating of the optical fiber.

13. The method of claim 12, wherein relaying at least the portion of the thermal radiation to the heating region comprises:
    receiving the thermal radiation on at least one reflective surface; and
    reflecting the thermal radiation from the at least one reflective surface to the heating region.

14. The method of claim 12, wherein relaying at least the portion of the thermal radiation to the heating region comprises:
    receiving the thermal radiation on at least one focusing element disposed between the heat source and the heating region;
    focusing the thermal radiation with the at least one focusing element to the heating region.

15. The method of claim 12, wherein relaying at least the portion of the thermal radiation to the heating region comprises:
    receiving the thermal radiation on the at least one reflective surface; and reflecting the thermal radiation from the at least one reflective surface to at least one focusing element disposed between the heat source and the heating region; and focusing the thermal radiation with the at least one focusing element to the heating region.

16. The method of claim 12, wherein relaying at least the portion of the thermal radiation to the heating region comprises:
expanding the thermal radiation from the heat source with a cylindrical lens;
collimating the thermal radiation expanded by the cylindrical lens with a first aspheric lens; and
focusing the thermal radiation collimated by the first aspheric lens with a second aspheric lens to the heating region.

17. The method of any of claim 12, further comprising explosively removing the at least one coating from the lengthwise section of the optical fiber disposed in the heating region.

18. The method of claim 12, wherein the optical fiber has an inner coating surrounded by an outer coating, and wherein relaying at least a portion of the thermal radiation to the heating region comprises heating the heating region to a temperature above a thermal decomposition temperature of the outer coating and below a thermal decomposition temperature of the inner coating.

19. The method of claim 12, comprising activating the heat source to a temperature of above 800 degrees Celsius in less than one second to generate thermal radiation to cause the at least one coating from the lengthwise section of the optical fiber disposed in the heating region to be removed.

20. The method of claim 12, comprising relaying the received at least the portion of the thermal radiation to the heating region to a temperature of at least about 400 degrees Celsius in less than one second.

21. The method of claim 13, wherein the separation distance is between approximately 5-50 μm.

22. An apparatus for stripping at least one coating from a lengthwise section of an optical fiber, comprising:
a heat source configured to generate thermal radiation;
a heating region spaced a separation distance from the heat source and configured to accommodate the optical fiber;
a relay system configured to relay at least a portion of the thermal radiation from the heat source to the heating region for heating the heating region to a temperature above a thermal decomposition temperature of the at least one coating of the optical fiber;
wherein the relay system comprises at least one reflective surface configured to receive and reflect the thermal radiation and wherein:
the relay system comprises a cylinder member having an elliptical-shaped cross-section with a first focal axis and a second focal axis;
the at least one reflective surface is an inner surface of the cylinder member, wherein:
the heat source is disposed substantially along the first focal axis; and
the heating region is located substantially along the second focal axis;
a securing mechanism configured to secure the optical fiber so that the lengthwise section of the optical fiber is positioned in the heating region; and
a controller configured to activate the heat source.

* * * * *

UNITED STATES PATENT AND TRADEMARK OFFICE
CERTIFICATE OF CORRECTION

PATENT NO. : 10,634,847 B2
APPLICATION NO. : 15/602608
DATED : April 28, 2020
INVENTOR(S) : Klaus Hartkorn It is certified that error appears in the above-identified patent and that said Letters Patent is hereby corrected as shown below:

In the Claims

In Column 17, Line 13, Claim 17, after "of" delete "any of".

Signed and Sealed this
Twenty-first Day of July, 2020

Andrei Iancu
*Director of the United States Patent and Trademark Office*